US012786061B2

(12) United States Patent
Ballew et al.

(10) Patent No.: US 12,786,061 B2
(45) Date of Patent: Nov. 3, 2026

(54) SYSTEMS AND METHODS FOR DEVICE UPGRADES USING VERSION CONTROLLED BEACON

(71) Applicant: CenturyLink Intellectual Property LLC, Denver, CO (US)

(72) Inventors: Dean Ballew, Sterling, VA (US); John R.B. Woodworth, Amissville, VA (US)

(73) Assignee: CenturyLink Intellectual Property LLC, Denver, CO (US)

( * ) Notice: Subject to any disclaimer, the term of this patent is extended or adjusted under 35 U.S.C. 154(b) by 267 days.

(21) Appl. No.: 18/652,179

(22) Filed: May 1, 2024

(65) Prior Publication Data

US 2024/0380656 A1 Nov. 14, 2024

Related U.S. Application Data

(60) Provisional application No. 63/501,065, filed on May 9, 2023.

(51) Int. Cl.

| | |
|---|---|
| ***H04L 41/0859*** | (2022.01) |
| ***H04L 41/0686*** | (2022.01) |
| ***H04L 41/0853*** | (2022.01) |
| *H04L 41/0823* | (2022.01) |

(52) U.S. Cl.

CPC ...... *H04L 41/0859* (2013.01); *H04L 41/0686* (2013.01); *H04L 41/0856* (2013.01); *H04L 41/0836* (2013.01)

(58) Field of Classification Search

None

See application file for complete search history.

(56) References Cited

U.S. PATENT DOCUMENTS

| | | | | |
|---|---|---|---|---|
| 7,523,097 | B1 * | 4/2009 | Wilson | G06F 11/1469 |
| 9,804,855 | B1 * | 10/2017 | Paningipalli | G06F 9/4406 |
| 10,303,588 | B2 * | 5/2019 | Lee | G06F 9/4406 |
| 10,534,760 | B1 * | 1/2020 | Ugur-Ozekinci | G06F 16/21 |
| 11,546,338 | B1 * | 1/2023 | Charnauski | G06F 9/451 |
| 11,888,695 | B1 * | 1/2024 | Subbaiah | H04L 41/082 |

(Continued)

FOREIGN PATENT DOCUMENTS

| | | | | |
|---|---|---|---|---|
| EP | 2209283 | A1 * | 7/2010 | H04L 65/1095 |
| EP | 4181555 | A1 * | 5/2023 | H04W 74/0833 |

(Continued)

OTHER PUBLICATIONS

Wan (WO 2017211091 A1); machine translated English version along with the original publication in Chinese (Year: 2017).*

(Continued)

*Primary Examiner* — Sandarva Khanal

(57) ABSTRACT

A method for upgrading one or more managed devices in a network includes receiving, by a managed device, a device configuration update comprising an identifier for a beacon service. The method also includes causing a backup file for the first managed device to be generated and stored and updating the first managed device using the device configuration update. The method further includes detecting an expiration of a check-in timer and obtaining a beacon value from the beacon service. The method additionally includes determining, based on the beacon value, whether to undo the device configuration update using the backup file.

15 Claims, 4 Drawing Sheets

(56) References Cited

U.S. PATENT DOCUMENTS

| | | | | |
|---|---|---|---|---|
| 2006/0136702 A1* | 6/2006 | Vantalon | | G06F 21/16 713/1 |
| 2011/0122774 A1* | 5/2011 | Hassan | | H04L 63/0272 370/242 |
| 2013/0103740 A1* | 4/2013 | Tully | | H04N 21/251 709/203 |
| 2021/0155173 A1* | 5/2021 | Harata | | B60R 16/023 |
| 2022/0104220 A1* | 3/2022 | Huang | | H04W 48/16 |

FOREIGN PATENT DOCUMENTS

| | | | | |
|---|---|---|---|---|
| WO | WO-2017181931 A1 * | 10/2017 | | G06F 11/203 |
| WO | WO-2024139758 A1 * | 7/2024 | | H04L 41/0846 |

OTHER PUBLICATIONS

WO 2015103735 A1; machine translated English version along with the original publication in Chinese (Year: 2015).*

* cited by examiner

SYSTEMS AND METHODS FOR DEVICE UPGRADES USING VERSION CONTROLLED BEACON

CROSS-REFERENCE TO RELATED APPLICATIONS

This application claims the benefit of U.S. Provisional Application No. 63/501,065 filed May 9, 2023, entitled "Systems and Method for Device Upgrades Using Version Controlled Beacon," which is incorporated herein by reference in its entirety.

BACKGROUND

Network devices, such as routers, can be used to connect other types of devices to a network. Network devices may need to periodically be updated to ensure proper operation of the network devices can communications with other devices and networks. Some updates may affect how the network devices interact with the network.

It is with respect to this general technical environment that aspects of the present disclosure are directed.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Systems and methods for device upgrades using a version-controlled beacon are provided. In one aspect of the present disclosure, a method is provided comprising receiving, by a first managed device, a device configuration update. The device configuration update may include an identifier for a beacon service. The method also includes causing the first managed device to generate and store a backup file for the first managed device and updating the first managed device using the device configuration update. The method further includes upon detecting an expiration of a check-in timer, obtaining, by the first managed device, a beacon value from the beacon service. Additionally, the method includes determining, based on the beacon value, whether to undo the device configuration update using the backup file.

In another aspect of the present disclosure, a method for updating a managed device in a network comprises receiving a device configuration update that includes an identifier for a beacon service. The method also includes generating and storing a backup file of a past device configuration and updating to a new device configuration using the device configuration update. The method further includes determining an indication of success of the new device configuration, transmitting the indication of success, and requesting a beacon value from the beacon service upon an expiration of a check-in timer. Additionally, the method includes determining, based on the beacon value, whether to: use the new device configuration, wait to use the new device configuration, or to roll back the new device configuration and use the backup file of the past device configuration.

In yet another aspect of the present disclosure, a system for updating managed devices in a network comprises one or more managed devices. The one or more managed devices comprise at least one processor and memory, operatively connected to the at least one processor and storing instructions. The instructions, when executed by the at least one processor, cause the system to receive a device configuration update that includes an identifier for a beacon service and generate and store a backup file of an old device configuration. The instructions, when executed by the at least one processor, additionally cause the system to update the one or more managed devices to a new device configuration using the device configuration update and to communicate with the beacon service at a check-in interval to obtain a beacon value. Further, the instructions, when executed by the at least one processor, cause the system to determine, based on the beacon value, whether to roll back the new device configuration update and use the backup file of the past device configuration.

BRIEF DESCRIPTION OF THE DRAWINGS

Non-limiting and non-exhaustive examples are described with reference to the following Figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems, or devices. Accordingly, examples may take the form of a hardware implementation, an entirely software implementation, or an implementation combining software and hardware aspects. In addition, all systems described with respect to the Figures may comprise one or more machines or devices that are operatively connected to cooperate in order to provide the described system functionality. The following detailed description is therefore not to be taken in a limiting sense, and the scope of the present disclosure is defined by the appended claims and their equivalents.

Updating network devices, such as routers, is necessary to ensure the network infrastructure devices are secure and perform their functions properly. Most of the time, updates will be successful and not cause any issues for the network devices or other devices interconnected with the network devices. In some instances, updates may have security vulnerabilities while some updates may have undesired effects on network devices and devices connected thereto. For example, an update may cause one or more network devices to fail or experience a fault. As an update will often be rolled out to many network devices simultaneously, the network devices may all simultaneously experience a fault and cause a widespread outage.

Additionally, because updates may affect the networking capabilities of the network devices, fixing the update may be exceedingly difficult. For example, a router could receive updated configuration settings and/or firmware that renders the router with limited to no connectivity to the broader network (e.g., Internet). Thus, fixing the "bad" update may require action other than simply updating the router again. Again, as many network devices may be updated simultaneously, fixing all the network devices that have limited to no connectivity to the broader network may be challenging.

Disclosed herein are systems and methods for updating managed devices in a network, such as routers, to ensure that any updates may be rolled back or undone, even if connectivity to the managed devices is limited or non-existent.

Figure 1:
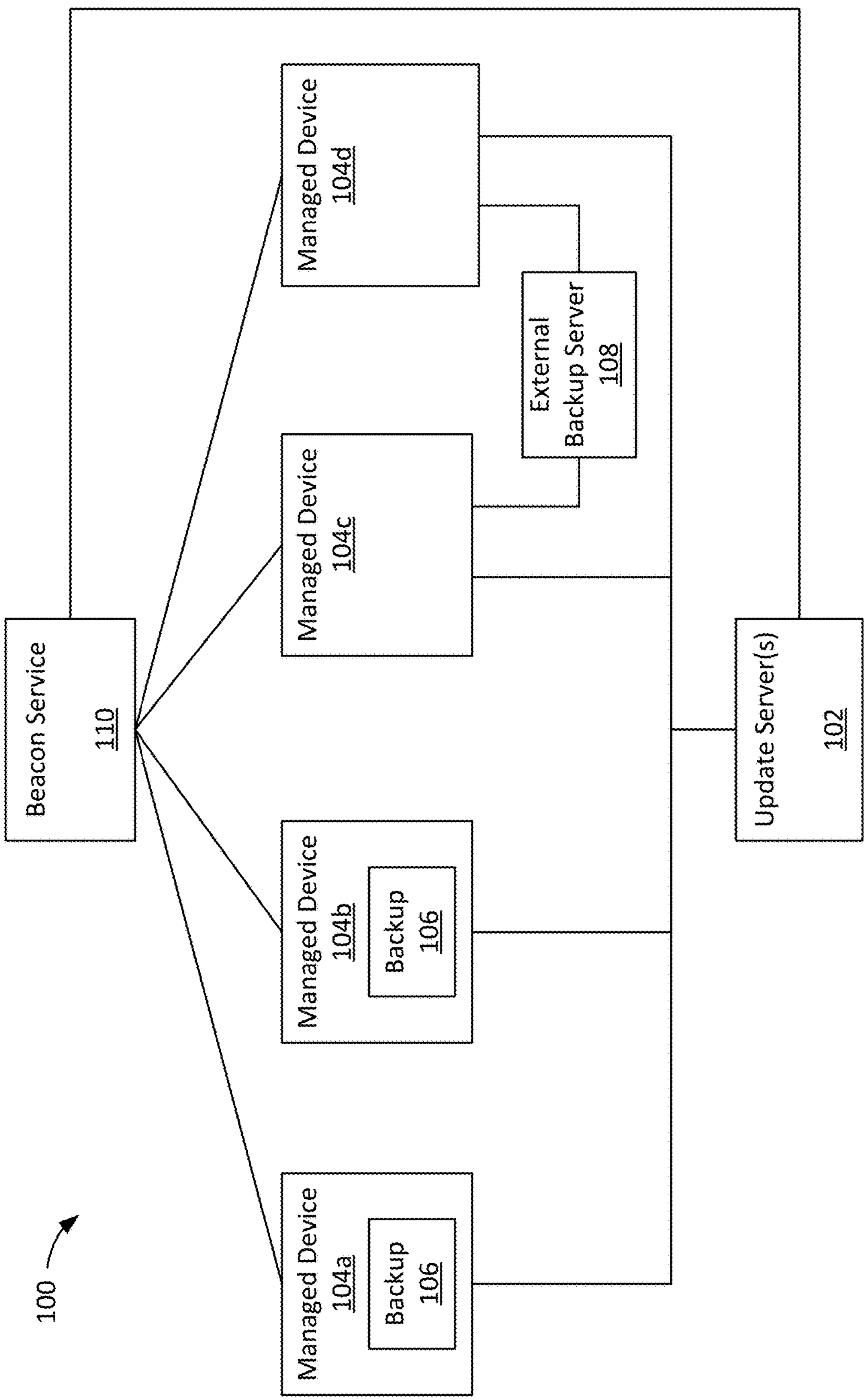
FIG. 1 is a block diagram of a system for updating managed devices in a network according to an aspect of the present disclosure.

FIG. 1 is a block diagram of a system for updating managed devices in a network according to an aspect of the present disclosure. The system 100 includes one or more update server(s) 102 operatively connected with one or more managed devices 104*a* and 104*b* that each contain an internal backup 106. The update server may also be operatively connected with one or more managed devices 104*c* and 104*d* that do not contain an internal backup 106 but are instead operatively connected to an external backup server 108. The system 100 also includes a beacon service 110 that is operatively connected with the one or more managed devices 104 and with the update server 102. Managed devices 104*a*, 104*b*, 104*c*, 104*d* may be individually and collectively referred to herein as managed devices 104.

The update server 102, being operatively connected with the managed devices 104, is configured to transmit updates to the managed devices 104. The updates may be device configuration updates which include driver updates, firmware updates, software updates, and the like. In some examples, the update server 102 is configured to transmit more than one update. In some examples, the update server 102 is configured to transmit different updates to different devices. For example, the update server may transmit a first update to a first set of one or more managed devices (e.g., 104*a*, 104*b*) and may transmit a second update to a second set of one or more managed devices (e.g., 104*c*, 104*d*). More than one update server 102 may be used to update the managed devices 104.

The managed devices 104 may be any type of device and are operatively connected with both the update server 102 and the beacon service 110. In some examples, the managed devices 104 comprise network connected devices such as routers, switches, or gateways. The managed devices 104 are configured to receive updates from the update server 102, such as device configuration updates, and to implement such updates.

Each of the managed devices 104*a* and 104*b* includes an internal backup 106. The internal backup 106 may comprise computer storage media, such as computer memory (e.g., flash memory) that is used to store one or more backup files of the managed device 104*a* or 104*b*. The backup files may comprise a device configuration that includes device drivers, firmware, software, and the like. For instance, in some examples, the backup may store multiple backup files with each backup file corresponding to a different version of the device configuration. In some examples, the backup 106 comprises non-volatile computer memory such that in the event of a power outage, any backup files stored in the backup 106 are not lost.

In a similar fashion to the backups 106 of the managed devices 104*a*, 104*b*, the managed devices 104*c*, 104*d* may be operatively connected with an external backup server 108. The external backup server 108 is external to the managed devices 104*c*, 104*d* but is operatively connected with the managed devices 104*c*, 104*d*. As with the internal backups 106 of the managed devices 104*a*, 104*b*, the external backup server 108 may comprise computer storage media, such as computer memory that is used to store one or more backup files of the managed devices 104*c*, 104*d*. Again, the backup files may comprise a device configuration that includes devices drivers, firmware, software, and the like. In some examples, the external backup server 108 comprises non-volatile computer readable memory such that in the event of a power outage, any backup files stored in the external backup server 108 are not lost.

In some examples, a managed device includes both an internal backup 106 and is operatively connected with an external backup server 108. In some such examples, the internal backup 106 and the external backup server 108 are redundant storage for backup files. For example, a backup file for a managed device may be stored in both an internal backup 106 and on an external backup server 108. Thus, in a case where one of the internal backup 106 or the external backup server 108 fails, the managed device could still access a backup file containing a device configuration. In another example, the internal backup 106 may store a most recent backup file while the external backup server stores older backup files.

Continuing with FIG. 1, the system 100 includes the beacon service 110, which is operatively connected with all the managed devices 104 and with the update server 102. The beacon service 110 may include one or more separate computing systems or may include application(s), script(s), or process(es) carried out by one or more of the other computing system(s) of system 100. For instance, in some examples, the beacon service 110 may include a beacon server that is distinct from the update server 102. In some examples, the beacon service 110 is a server operated on the same computing system as the update server 102. Alternatively, in some examples, the beacon service is an application, script, or other process operated by the update server 102.

The beacon service 110 may be configured to receive a command from the update server 102 and to send a beacon value to the managed devices 104. The beacon value may comprise information of the command. For example, the beacon value may be a translated version of the command received from the update server. Additionally or alternatively, the beacon value may simply be a copy of the command received from the update server 102 that is relayed to the managed devices 104. In some examples, broadcasting the command includes providing the command to one or more managed devices 104 that request the command. For example, the beacon service 110 may receive a command from the update server 102 and one or more managed devices 104 may obtain the beacon value comprising the command from the beacon service 110. While illustrated and described as being operatively connected with the update server 102 and configured to receive a command from the update server 102, in some examples, the beacon service 110 is operatively connected with an external server different from the update server 102 that communicates the command to the beacon service.

As described, the beacon service 110 may receive a command from the update server 102 and may send a beacon value to the managed devices 104. The beacon value, when broadcast by the beacon service 110, may comprise the command received by the update server 102. In some examples, the beacon value comprises one of a wait command, a complete command, or a rollback command. Each of the commands may correspond to different operations of the system 100. A command, in the context of this disclosure, may be a word, phrase, numerical code, or other indication that causes the prescribed behavior. For example, the wait command, the complete command, and the rollback command may be signals sent by the beacon service 110 to the managed devices 104 that are interpreted by the managed devices 104 (e.g., according to a shared protocol) to correspond to different operations of the managed devices 104.

In an example operation of the system 100 of FIG. 1, an update server 102 sends out a device configuration update to each of the managed devices 104 that may include an updated configuration file. The device configuration update may also include an identifier for a beacon service 110 that enables the managed devices 104 to connect to the beacon service 110. Once the device configuration update is received, the managed devices 104 may store a backup file. The backup file may include the current configuration settings, firmware, and/or other data related to the current configuration with which the managed devices 104 are operating. The backup file is stored in a storage medium. For the managed devices 104*a*, 104*b* that include an internal backup 106, the managed devices 104*a*, 104*b* may store the backup file locally in their internal backup 106. However, for managed devices 104*c*, 104*d* that are instead operatively connected with an external backup server 108, the managed devices 104*c*, 104*d* may store the backup file in the external backup server 108.

The managed devices 104 may subsequently update themselves with the updated configuration file they received from the update server 102. During the update and/or thereafter, the managed devices 104 may communicate with the beacon service 110 to obtain a beacon value. The managed devices 104 may communicate with the beacon service 110 via the identifier received from the update server 102 (e.g., in the device configuration update). The beacon value may comprise a command received from the update server 102. The command may comprise one of a wait command, a complete command, or a rollback command. After obtaining a beacon value, the managed devices 104 may each determine what to do based on the beacon value.

First, if the managed devices 104 receive a complete command, the managed devices 104 may continue to operate using the updated configuration file. In some examples, the managed devices 104 instead start to operate using the updated configuration file after receiving a complete command. In addition to operating, or continuing to operate using the updated configuration file, in some examples, the managed devices 104*a*, 104*b* erase their local backup file of the now outdated device configuration from the internal backup 106. Similarly, in some examples, the external backup server 108 erase the backup file of the now outdated device configuration. In some such examples, the managed devices 104*c*, 104*d* communicate to the external backup server 108 to erase the backup file. In the context of this disclosure, erasing a backup file may include deleting, unallocating, de-indexing, releasing, overwriting, or otherwise removing the backup file from computer memory such that the memory storing the backup file may be written to with other data (e.g., a subsequent backup file).

Second, if the managed devices 104 receive a rollback command, the managed devices 104 may undo the update to the new device configuration. Further, the managed devices 104 may use the backup file that is stored in the internal backup 106 or the backup server 108, as applicable, to restore a previous configuration. In some examples, the internal backup 106 and/or the external backup server 108 stores multiple, previous device configurations. In some such examples, when the managed devices 104 receive a rollback command, the managed devices 104 undo the update to the new device configuration and will restore/use one of the configurations stored in the backup 106 or the backup server 108. For example, the managed devices 104 may restore/use the last known "good" (e.g., working, stable, etc.) device configuration which may be the most recently stored device configuration or an older device configuration.

Further, if the managed devices 104 receive a wait command, the managed devices 104 may simply wait to operate with the new device configuration. Alternatively, in some examples, the managed devices 104 operate using the new device configuration, but will not perform any other actions described with respect to the managed devices 104 receiving a complete command or rollback command. For example, the managed devices 104, in response to receiving a wait command, may continue to operate with the new device configuration, but not erase the backup file containing the previous device configuration unless the managed devices 104 subsequently receive a complete command. In another example, the managed devices 104, in response to receiving a wait command, may continue to operate with the new device configuration, but not rollback the update and use a backup device configuration unless the managed devices 104 subsequently receive a rollback command. Accordingly, after receiving the wait command, the managed devices 104 may wait to perform any action until/unless the managed devices 104 receive a subsequent complete command or rollback command.

In some examples, the external backup server 108 communicates with the beacon service 110 and/or the update server separately from the managed devices 104*c*, 104*d*. In some such examples, the external backup server 108 receives a beacon value or other communication that causes the external backup server 108 to erase a backup file or to send a backup file to one or more managed devices 104*c*, 104*d*. For example, the external backup server 108 may receive a beacon value from the beacon service 110 that comprises a complete command and may accordingly erase a backup file. In such instances, the managed devices 104*c*, 104*d* do not need to communicate with the external backup server 108 after receiving a complete command to erase a backup file.

Continuing with the example of FIG. 1, the system 100 may utilize one or more timers that dictate how the system 100 operates. The timers may include a check-in timer, a polling timer, a burn-in timer, and an ultimate timer. Starting with the check-in timer, the managed devices 104 may communicate with the beacon service 110 to receive a beacon value at intervals set by the check-in timer. For example, upon the expiration of the check-in timer, the managed devices 104 may communicate with the beacon service 110 to obtain a beacon value. In some examples, the managed devices 104 poll the beacon service at intervals determined by the check-in timer to obtain the beacon value. This may be advantageous as the managed devices 104 need not be in constant communication with the beacon service 110 but may still detect when a beacon value changes. In other examples, the beacon service 110 may push the beacon value to one or more managed device 104 at intervals set by the check-in timer following an initial request for the beacon value from the managed device 104 (which may include a value of the check-in timer).

The check-in timer may have any duration and need not have a constant value. For instance, in some examples, the check-in timer has a changing value while in some examples, the check-in timer has a constant value. In some examples, each of the managed devices 104 have check-in timers that are the same length and are coordinated such that they obtain a beacon value from the beacon service 110 at substantially the same time. However, in some examples, each of the managed devices 104 have check-in timers that are coordinated such that they obtain a beacon value from the beacon service at differing times. A person having ordinary skill in the art will appreciate the managed devices 104 may each have check-in timers that vary in length and are/are not coordinated with the check-in timers of other managed devices. In some examples, the managed devices 104 are configured to receive a check-in timer length from the beacon service 110 or from the update server 102 (e.g., as part of the device configuration update).

Moving to the polling timer, the polling timer may aid in situations where a managed device (e.g., managed device 104) can no longer communicate with the beacon service 110 or cannot otherwise obtain a beacon value from the beacon service 110. For example, a managed device 104 may initiate a polling timer upon a first request of the managed device 104 to obtain a beacon value from the beacon service 110 (e.g., following a request made after expiration of the check-in timer). Subsequently, if the polling timer expires before the managed device obtains a beacon value, the managed device may automatically undo the device configuration update using the backup file. Thus, if the managed device 104 cannot communicate with the beacon service 110, which may be indicative of an issue with the device configuration update, the managed device 104 may return to a previous device configuration which is known to be working. As will be appreciated, the polling timer may be specific to the particular device configuration update for which the beacon value is sought.

In some examples, the polling timer is re-initiated (e.g., reset) each time the associated managed device 104 obtains a beacon value from the beacon service 110. For example, a managed device 104 may initiate a polling timer and, upon receiving a wait command (e.g., the beacon value from the beacon service 110), the polling timer may be re-initiated. Re-initiating the polling timer may include resetting the polling timer to its original value (e.g., length of time). If the polling timer expires, however, the managed device 104 may automatically undo the device configuration update using a backup file. Re-initiating the polling timer upon receiving a beacon value from the beacon service 110 may ensure that if communication between the managed device and the beacon service fails even after a first successful communication, the managed device 104 may return to a previous device configuration. For example, the polling timer may initiate upon a first request of a managed device 104 to obtain a beacon value from a beacon service 110. The managed device 104 may then obtain a beacon value from the beacon service 110, such as a wait command, at a time before the polling timer expires. The managed device 104 may subsequently continue to request a beacon value from the beacon service 110 at regular intervals (e.g., based on the check-in timer) to determine if the beacon value has changed. If communication is successful and the managed device 104 obtains a beacon value, the polling timer will re-initiate. However, if the managed device 104 cannot obtain a beacon value from the beacon service before the re-initiated polling timer expires, the device configuration update of the managed device will be undone. As will be appreciated, the polling timer is generally longer in duration than the check-in timer.

Moving to the ultimate timer, the ultimate timer may be helpful in cases where a managed device 104 is operatively connected with the beacon service 110 and is consistently obtaining beacon values from the beacon service, but in which the beacon values never include a complete command. These cases may be due to a variety of factors such as a complete command not being able to be sent to the beacon service, the beacon service 110 having internal issues, or some communication error with the beacon service 110 (e.g., between the beacon service 110 and the update server 102).

In some examples, an ultimate timer is initiated upon a managed device 104 obtaining a first beacon value from the beacon service 110. Alternatively, in some examples, an ultimate timer is initiated upon a first request by the managed device 104 to obtain a first beacon value from the beacon service 110. After being initiated, the ultimate timer will continuously decrease if a beacon value obtained by the managed device 104 is not a rollback command or a complete command. For instance, in some examples, the ultimate timer will continue to decrease if the beacon value is a wait command. Additionally or alternatively, in some examples, the ultimate timer will continue to decrease if no beacon value is able to be obtained. In some examples, upon the ultimate timer expiring, the device configuration update is undone, and the managed device 104 will use the backup file with a previous device configuration. The ultimate timer may be stopped or otherwise deactivated upon the managed device 104 obtaining a complete command or rollback command from the beacon service 110.

Moving to the burn-in timer, the burn-in timer may be helpful to ensure that any issues with a device configuration update that are not immediately detectable are able to be resolved using a previous device configuration. The burn-in timer is most useful after the beacon service 110 broadcasts a beacon value comprising a complete command. In this case, managed devices 104 that received a device configuration update may appear to be operating properly. However, an issue may be discovered in the device configuration update, or the device configuration update may have an issue that does not present itself until after a period of time. To ensure managed devices 104 have an opportunity to return to a proper operating state, a burn-in timer may be set.

In some examples, the burn-in timer is initiated upon a managed device 104 obtaining a complete command from the beacon service. The managed device 104 may initiate the burn-in timer. The managed device 104 may then use the new device configuration and suspend any further requests to obtain a beacon value. Upon the burn-in timer expiring, however, the managed device 104 may request a final beacon value from the beacon service. If, for example, the final beacon value comprises a complete command, the managed device 104 may delete its backup file of a past device configuration and continue operating with the new device configuration of the update. However, if the final beacon value comprises a rollback command, or in some examples, a wait command, the managed device 104 may undo the device configuration update and use the backup file with a previous device configuration. Similarly, in some examples, if the burn-in timer expires and a beacon value is not able to be obtained by the managed device 104, the managed device 104 may undo the device configuration and use the backup file.

In similarity with the check-in timer, each of the polling timer, the ultimate timer, and the burn-in timer may have any duration and need not have a constant value. For instance, in some examples, one or more of the check-in timer, the polling timer, the ultimate timer, and/or the burn-in timer has a changing value that is individual to the device configuration update. Additionally or alternatively, one or more of the above listed timers has a constant value. In some examples, the managed devices 104 are configured to receive one or more of the check-in timer, the polling timer, the ultimate timer, and/or the burn-in timer length from the beacon service 110 or from the update server (e.g., as part of the device configuration update).

Figure 2:
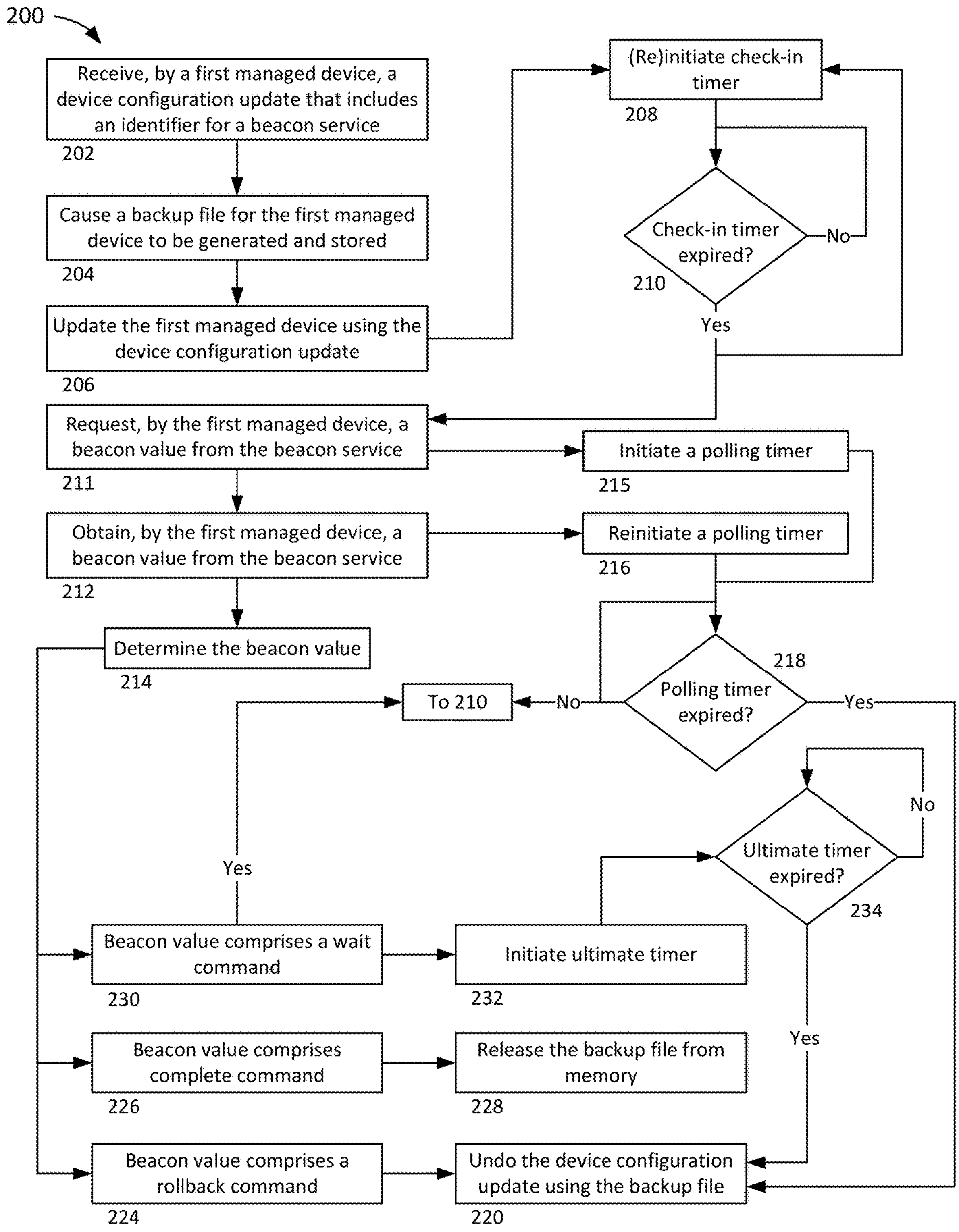
FIG. 2 is a flow chart of an example method for updating managed devices in a network according to an aspect of the present disclosure.

Now referencing FIG. 2, FIG. 2 is a flow chart of an example method 200 for updating managed devices in a network according to an aspect of the present disclosure. In some examples, the operations of method 200 may be performed by a managed device, such as managed device 104. Starting at operation 202, a device configuration update is received by a first managed device that includes an identifier for a beacon service. Flow may proceed to operation 204, where a backup file for the first managed device is caused to be generated and stored. For example, the first managed device may generate a backup file and store it in an internal backup or send it to an external backup storage. As discussed elsewhere herein, the backup file may include the current device configuration of the managed device (e.g., before the update). Continuing with operation 206, the method 200 includes updating the first managed device using the device configuration update. Flow may proceed to operation 208, where a check-in timer is initiated. For example, the first managed device may initiate the check-in timer. Further, in operation 210, a determination of whether the check-in timer has expired is made. In some examples, the first managed device determines if the check-in timer has expired. If the check-in timer has not expired, flow may continue with operation 210 until the check-in timer has expired. Once the check-in timer has expired, the check-in timer is reinitiated at operation 208. In some examples, the check-in timer is periodic and is repeatedly reinitiated upon expiration until the method 200 terminates with one of operations 228 or 220 (as described below).

When the check-in timer expires, flow also proceeds to operation 211. At operation 211, a beacon value is requested by the first managed device from the beacon service. If it is the first time a beacon value has been requested for the particular device configuration update, then flow proceeds to operation 215, where a polling timer is initiated. From operation 215, flow proceeds to operation 218, where it is determined whether the polling timer has expired. If not, then operation 218 is continued (e.g., continually or periodically) to check whether the polling timer has expired. In some examples, the polling timer is checked for expiration until the method 200 terminates with one of the operations 228 or 220 (as described below). When the polling timer has not expired, flow also proceeds back to operation 210, where the check-in timer is also (e.g., continually or periodically) checked for expiration. If the polling timer has expired, flow continues with operation 220, where the device configuration update is undone using a backup file, as is described elsewhere herein, and the method 200 ends.

Flow may also proceed from operation 211 to operation 212. In the example method 200 that is depicted, the request for a beacon value at operation 211 is successful, and, at operation 212, a beacon value is obtained from the beacon service by the first managed device. In the instance where the request 211 for a beacon value successfully results in receiving a beacon value at the first managed device, the polling timer is reinitiated at operation 216. Flow proceeds from operation 216 to operation 218, where the polling timer is checked for expiration, as described. In this manner, as long as the request at operation 211 successfully results in obtaining a beacon value at operation 212 in the time allowed for by the polling timer, the polling timer will be reinitiated at operation 216 prior to expiration, and flow will proceed to operation 214 without interruption (e.g., by ending method 200 by operation 220).

From operation 212, flow may continue with determining the beacon value in operation 214, where the beacon value is determined. Based on the beacon value, flow may continue with one of operations 232, 228, or 220. For example, if the beacon value comprises a rollback command as in operation 224, flow continues with operation 220 where the device configuration update is undone using a backup file, and the method 200 ends. Alternatively, if the beacon value comprises a complete command as in operation 226, flow may continue with operation 228. In operation 228, the backup file may be released from memory or otherwise deleted (e.g., from an internal backup or an external backup server), and method 200 ends. In some examples, the first managed device releases the backup file from memory/deletes the backup file and/or instructs an external backup to do so. In other examples (e.g., as described with respect to FIG. 3), a burn-in timer may be employed, and the backup file may not be deleted unless and until the burn-in timer expires. In a further alternative, if the beacon value is determined in operation 230 to be a wait command, flow may proceed back to operation 210. In some examples, flow may also continue from operation 230 (after receiving a wait command) with operation 232 initiating an ultimate timer in operation 232. In other examples, the ultimate timer at operation 232 may be initiated following the first request for a beacon value for a particular configuration update at operation 211. From operation 232, flow continues with determining whether the ultimate timer has expired as in operation 234. In some examples, the ultimate timer is checked repeatedly (e.g., continually or periodically) to determine whether it has expired prior to the method 200 ending either at operation 228 or 220. That is, the ultimate timer will continue to run unless and until a beacon value is determined at operation 226 or 224 to comprise a complete command or a rollback command, thus resulting in one of operations 228 or 220. If the ultimate timer expires prior to the end of method 200, flow continues with undoing the device configuration update using the backup file at operation 220, and the method 200 ends.

Figure 3:
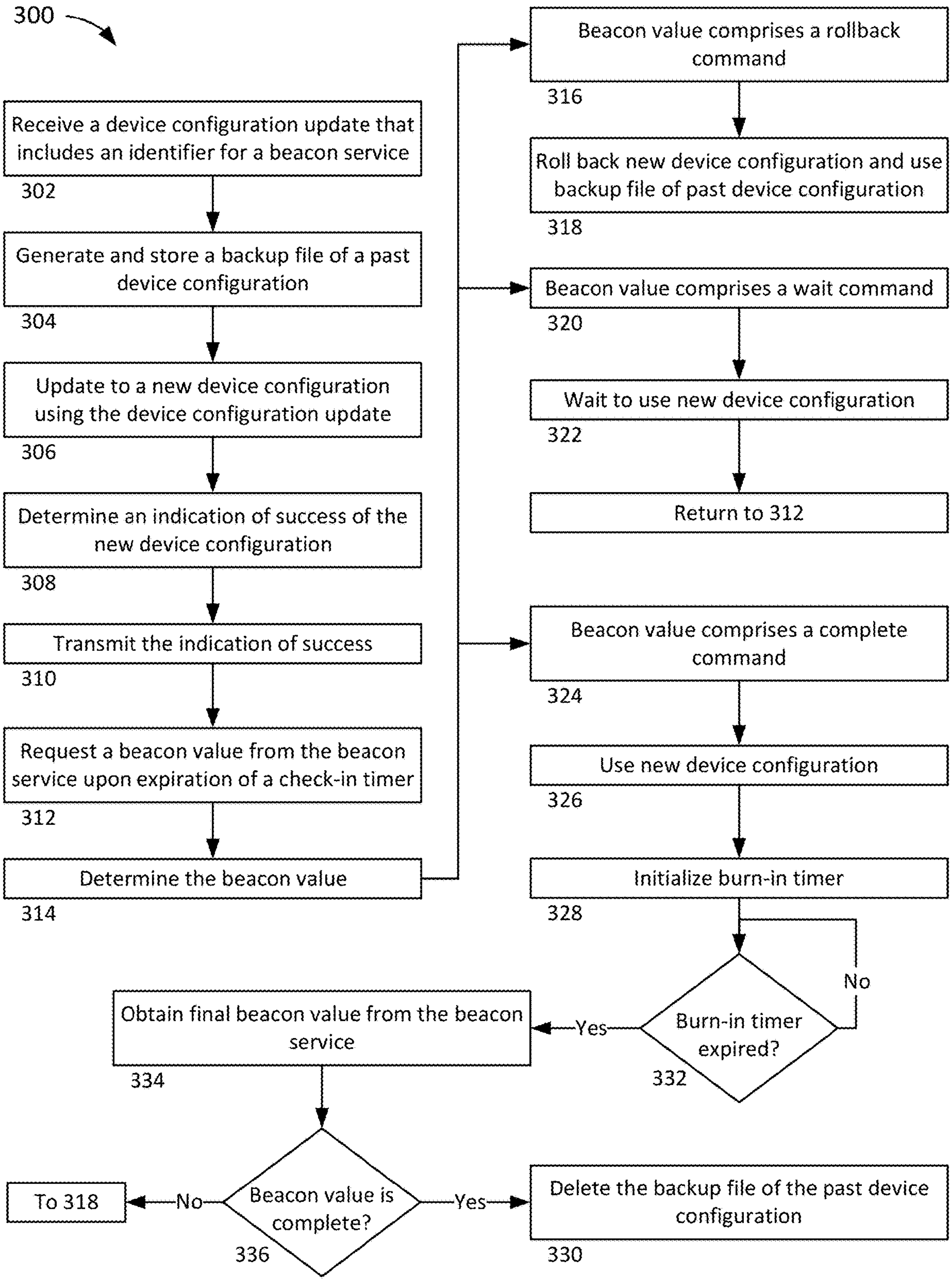
FIG. 3 is a flow chart of another example method for updating a managed device in a network according to an aspect of the present disclosure.

Moving to FIG. 3, FIG. 3 is a flow chart of another example method 300 for updating a managed device in a network according to an aspect of the present disclosure. Aspects of method 300 are similar to method 200 and are not repeated here. In method 300, however, a burn-in timer may also be used, as described previously and below. Starting with operation 302, the method may include receiving a device configuration update that includes an identifier for a beacon service. Next, the method may include generating and storing a backup file of a past device configuration in operation 304. The method may further include updating to a new device configuration using the device configuration update received as in operation 306. Further, the method may include determining an indication of success of the new device configuration in operation 308. An example of an indication of success is that the managed device may communicate and/or operate as it did previously, and that the managed device does not become unresponsive or cannot be communicated with by other devices. In some examples, a self-test is used to determine an indication of success of the new device configuration. The method may continue with transmitting the indication of success (e.g., to the beacon service and/or update server) at operation 310. In addition, a beacon value may be requested at operation 312 upon expiration of a check-in timer, as described (e.g., in relation to FIG. 2). In operation 314, the method includes determining the beacon value.

If the determined beacon value comprises a rollback command as in operation 316, the method continues with rolling back the new device configuration of the managed device and using a backup file of a past device configuration as in operation 318 (as previously described). If the determined beacon value comprises a wait command as in operation 320, the method may return to operation 312, requesting a beacon value from the beacon server upon expiration of a check-in timer (as previously described). If the determined beacon value comprises a complete command as in operation 324, the method may continue with using the new device configuration in operation 326. From operation 326, the method may continue with operation 328, where a burn-in timer is initiated. Initiating of the burn-in timer may also include suspending the requesting of a beacon value from the beacon service. For example, the check-in timer described with respect to FIG. 2 may be suspended once a complete command has been received at operation 324. At operation 332, the burn-in timer is repeatedly (e.g., periodically or continually) checked until it expires. When the burn-in timer expires, flow proceeds to operation 334, where a final beacon value is obtained (e.g., requested and received) from the beacon service. A determination of whether the beacon value comprises a complete command is made in operation 336. If the beacon value again comprises a complete command, the method may continue with operation 330, where the backup file of the past device configuration is deleted. However, if the beacon value does not comprise a complete command (e.g., a rollback command, a wait command, or something else), the method will continue with operation 318 and roll back to use the past device configuration of the backup file. In some examples, operation 336 may include a time-out function, whereby failure to receive a final beacon value from the beacon service within a specified time-out period following a request for such final beacon value may be interpreted as a non-complete beacon value, resulting in flow proceeding to operation 330. Method 300 ends upon the execution of operation 318 or 330.

While the examples of FIG. 2 and FIG. 3 are illustrated and described with various operations occurring in a specific order, a person having ordinary skill will appreciate the operations can be performed in other orders and that some operations may be performed simultaneously. For example, in FIG. 2, detecting if the check-in timer, polling timer, and/or the ultimate timer can occur while other operations are occurring. Further, while some operations are illustrated as dependent on others, the illustrated operations of the method do not necessarily depend on other operations illustrated as occurring before them. Moreover, one or more of the operations illustrated in FIG. 2 and FIG. 3 may be optional. For example, the operations of 328-336 may be optional in some examples of method 300.

Figure 4:
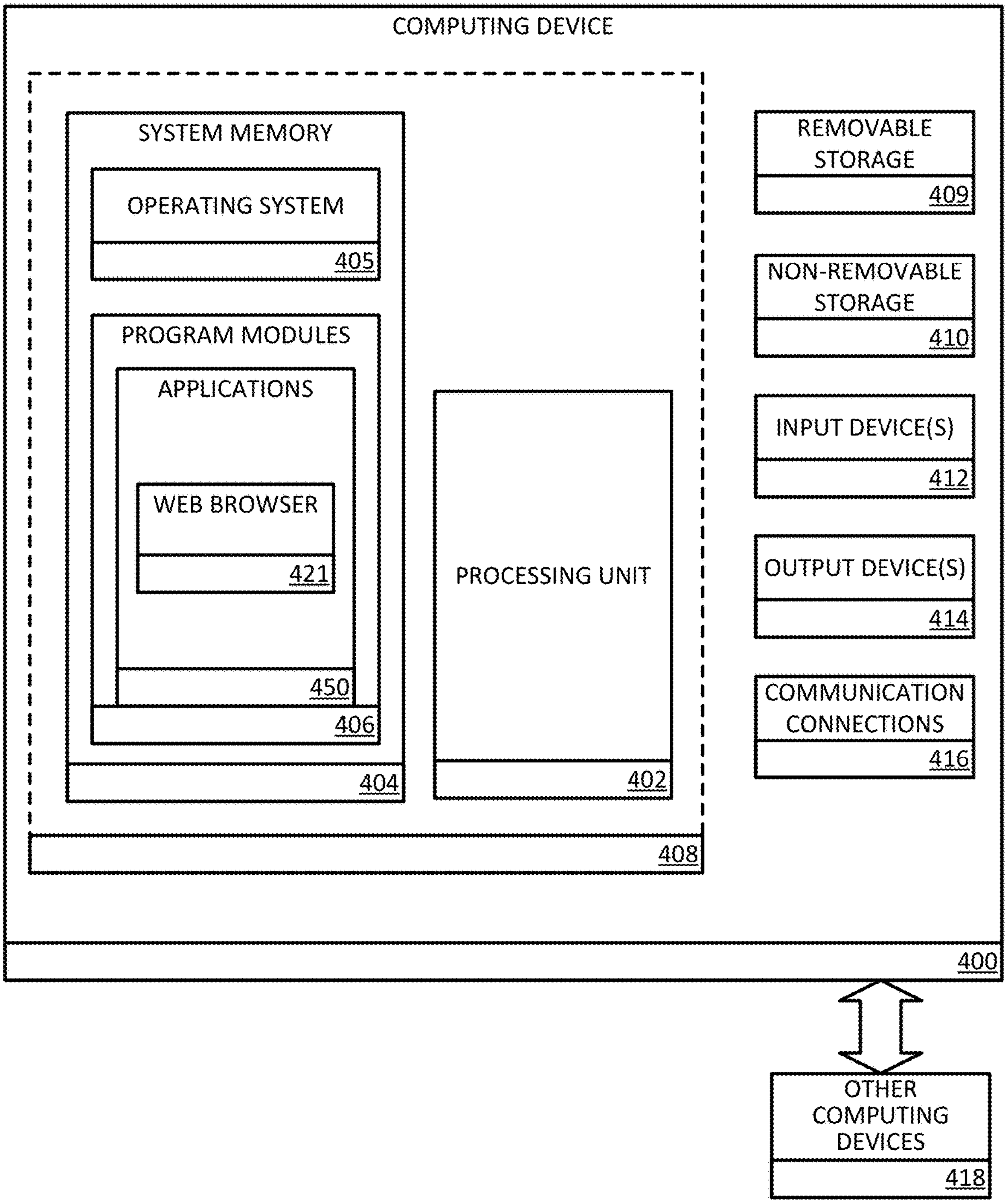
FIG. 4 is a block diagram of an example operating environment, according to an aspect of the present disclosure.

Moving to FIG. 4, FIG. 4 is a block diagram illustrating physical components (i.e., hardware) of a computing device 400 with which examples of the present disclosure may be practiced. The computing device components described below may be suitable for a computing device(s) implementing one or more of the update server 102, the managed devices 104, the backup 106, the external backup server 108, and/or the beacon service 110 of FIG. 1. In a basic configuration, the computing device 400 may include at least one processing unit 402 and a system memory 404. The processing unit(s) (e.g., processors) may be referred to as a processing system. Depending on the configuration and type of computing device, the system memory 404 may comprise, but is not limited to, volatile storage (e.g., random access memory), non-volatile storage (e.g., read-only memory), flash memory, or any combination of such memories. The system memory 404 may include an operating system 405 and one or more program modules 406 suitable for running software applications 450 to implement one or more of the systems described above with respect to FIG. 1.

The operating system 405, for example, may be suitable for controlling the operation of the computing device 400. Furthermore, aspects of the invention may be practiced in conjunction with a graphics library, other operating systems, or any other application program and is not limited to any particular application or system. This basic configuration is illustrated in FIG. 4 by those components within a dashed line 408. The computing device 400 may have additional features or functionality. For example, the computing device 400 may also include additional data storage devices (removable and/or non-removable) such as, for example, magnetic disks, optical disks, or tape. Such additional storage is illustrated in FIG. 4 by a removable storage device 409 and a non-removable storage device 410.

As stated above, a number of program modules and data files may be stored in the system memory 404. While executing on the processing unit 402, the program modules 406 may perform processes including, but not limited to, one or more of the operations of the methods illustrated in FIGS. 2-3. Other program modules that may be used in accordance with examples of the present invention and may include applications such as electronic mail and contacts applications, word processing applications, spreadsheet applications, database applications, slide presentation applications, drawing or computer-aided application programs, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to generating suggested queries, may be operated via application-specific logic integrated with other components of the computing device 400 on the single integrated circuit (chip). Examples of the present disclosure may also be practiced using other technologies capable of performing logical operations such as, for example, AND, OR, and NOT, including but not limited to mechanical, optical, fluidic, and quantum technologies.

The computing device 400 may also have one or more input device(s) 412 such as a keyboard, a mouse, a pen, a sound input device, a touch input device, etc. The output device(s) 414 such as a display, speakers, a printer, etc. may also be included. The aforementioned devices are examples and others may be used. The computing device 400 may include one or more communication connections 416 allowing communications with other computing devices 418. Examples of suitable communication connections 416 include, but are not limited to, RF transmitter, receiver, and/or transceiver circuitry; universal serial bus (USB), parallel, and/or serial ports. In examples, communications connections 416 may also include any necessary electrical networks between and among components of the presently described systems.

The term computer readable media as used herein may include computer storage media. Computer storage media may include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (i.e., memory storage.) Computer storage media may include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media may be non-transitory and tangible and does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Aspects of the present invention, for example, are described above with reference to block diagrams and/or operational illustrations of methods, systems, and computer program products according to aspects of the invention. Systems depicted as blocks may be communicatively connected to one or more other systems described, whether or not such connection(s) is/are drawn as such. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved. Further, as used herein and in the claims, the phrase "at least one of element A, element B, or element C" is intended to convey any of: element A, element B, element C, elements A and B, elements A and C, elements B and C, and elements A, B, and C.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for updating managed devices in a network, comprising:

receiving, by a first managed device, a device configuration update, wherein the device configuration update includes an identifier for a beacon service;

causing the first managed device to generate and store a backup file for the first managed device;

updating the first managed device using the device configuration update;

upon detecting an expiration of a check-in timer, obtaining, by the first managed device, a beacon value from the beacon service;

initiating a polling timer upon a first request of the first managed device to obtain the beacon value from the beacon service, and re-initiating the polling timer upon each subsequent receipt of the beacon value from the beacon service;

determining that the polling timer has expired; and based on determining that the polling timer has expired, undoing the device configuration update using the backup file.

2. The method of claim 1, wherein the beacon value comprises one of a wait command, a complete command, or a rollback command.

3. The method of claim 2, further comprising:

determining that the beacon value comprises the rollback command; and based on determining that the beacon value comprises the rollback command, undoing the device configuration update using the backup file.

4. The method of claim 2, further comprising:

determining that the beacon value comprises the complete command; and based on determining that the beacon value comprises the complete command, releasing the backup file from a memory of the first managed device.

5. The method of claim 2, further comprising:

determining that the beacon value comprises the wait command; and upon expiration of an ultimate timer, and based on determining that the beacon value comprises the wait command, undoing the device configuration update using the backup file.

6. The method of claim 1, wherein obtaining the beacon value from the beacon service comprises connecting, by the first managed device, to the beacon service via a URL.

7. The method of claim 1, wherein the beacon service sets a length of time of the check-in timer.

8. A method for updating a managed device in a network comprising:

receiving a device configuration update that includes an identifier for a beacon service;

generating and storing a backup file of a past device configuration;

updating to a new device configuration using the device configuration update;

requesting a beacon value from the beacon service upon an expiration of a check-in timer;

initiating a polling timer upon a first request of the first managed device to obtain the beacon value from the beacon service, and re-initiating the polling timer upon each subsequent receipt of the beacon value from the beacon service;

determining that the polling timer has expired; and based on determining that the polling timer has expired, undoing the device configuration update using the backup file.

9. The method of claim 8, wherein the backup file of the past device configuration is stored in non-volatile memory.

10. The method of claim 9, wherein the backup file of the past device configuration is stored on an external server in communication with the managed device.

11. The method of claim 8, further comprising rolling back the new device configuration and using the backup file of the past device configuration upon expiration of a polling timer.

12. The method of claim 8, further comprising:

upon detecting an expiration of a burn-in timer, attempting to communicate with the beacon service to obtain a final beacon value.

13. The method of claim 12, wherein, if the final beacon value is 'COMPLETE', the method further comprises deleting the backup file of the past device configuration.

14. A system for updating managed devices in a network, comprising:

one or more managed devices, the one or more managed devices comprising at least one processor, and memory, operatively connected to the at least one processor and storing instructions that, when executed by the at least one processor, cause the system to:

receive a device configuration update that includes an identifier for a beacon service;

generate and store a backup file of an old device configuration;

update the one or more managed devices to a new device configuration using the device configuration update;

communicate with the beacon service at a check-in interval to obtain a beacon value;

determine, based on the beacon value, to roll back the new device configuration and use the backup file of the old device configuration; and based on the determination to roll back the new device configuration, roll back the new device configuration using the backup file of the old device configuration;

a beacon server configured to run the beacon service; and an update server in communication with the beacon server and the one or more managed devices, the update server configured to transmit the device configuration update to the one or more managed devices and to set the beacon value of the beacon service.

15. The system of claim 14, wherein the backup file of the old device configuration comprises an operating system of the one or more managed devices.

* * * * *